US009453461B2

(12) United States Patent
Patel et al.

(10) Patent No.: US 9,453,461 B2
(45) Date of Patent: Sep. 27, 2016

(54) FUEL NOZZLE STRUCTURE

(71) Applicant: General Electric Company, Schenectady, NY (US)

(72) Inventors: Nayan Vinodbhai Patel, Cincinnati, OH (US); Duane Douglas Thomsen, Cincinnati, OH (US); Michael John McCarren, Alpha, OH (US); Kevin Vandevoorde, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 14/580,301

(22) Filed: Dec. 23, 2014

(65) Prior Publication Data
US 2016/0177834 A1 Jun. 23, 2016

(51) Int. Cl.
*F23R 3/28* (2006.01)
*F02C 7/22* (2006.01)
*F23R 3/34* (2006.01)

(52) U.S. Cl.
CPC ............... *F02C 7/22* (2013.01); *F23R 3/283* (2013.01); *F23R 3/346* (2013.01); *F05D 2220/32* (2013.01)

(58) Field of Classification Search
CPC .......... F02C 7/22; F23R 3/346; F23R 3/283; F23R 3/34; F23R 3/286; F23R 3/343; F23R 3/14; F23R 3/36; F23D 2206/10; F23D 11/383
See application file for complete search history.

(56) References Cited

U.S. PATENT DOCUMENTS

| 3,618,319 A | 11/1971 | Kydd |
| 4,375,745 A | 3/1983 | Schelp |
| 5,027,603 A | 7/1991 | Shekleton et al. |
| 5,345,768 A | 9/1994 | Washam et al. |

(Continued)

FOREIGN PATENT DOCUMENTS

| EP | 1471308 A1 | 10/2004 |
| EP | 2466206 A2 | 6/2012 |

(Continued)

OTHER PUBLICATIONS

European Search Report and Opinion issued in connection with corresponding EP Application No. 15199376.3 on Apr. 25, 2016.

(Continued)

*Primary Examiner* — Ehud Gartenberg
*Assistant Examiner* — Jason H Duger
(74) *Attorney, Agent, or Firm* — General Electric Company; Pamela A. Kachur (57) ABSTRACT

A gas turbine engine fuel nozzle apparatus includes: an annular outer body, the outer body extending parallel to a centerline axis, and having a generally cylindrical exterior surface extending between forward and aft ends, and having a plurality of openings passing through the exterior surface; an annular main injection ring disposed inside the outer body, the main injection ring including an annular array of fuel posts extending radially outward therefrom; a main fuel gallery extending within the main injection ring in a circumferential direction; a plurality of main fuel orifices, each main fuel orifice communicating with the main fuel gallery and extending through one of the fuel posts; and a suspension structure connecting the main injection ring to the outer body, the suspension structure configured to substantially rigidly locate the position of the main ring in axial and lateral directions while permitting controlled deflection in a radial direction.

13 Claims, 5 Drawing Sheets

(56) References Cited

U.S. PATENT DOCUMENTS

| | | | |
|---|---|---|---|
| 5,607,109 A * | 3/1997 | Von Berg | B23P 15/16 239/568 |
| 6,073,436 A | 6/2000 | Bell et al. | |
| 6,112,512 A | 9/2000 | Miller et al. | |
| 6,758,032 B2 | 7/2004 | Hunter et al. | |
| 6,898,926 B2 | 5/2005 | Mancini | |
| 7,533,532 B1 | 5/2009 | Toon et al. | |
| 7,658,075 B2 | 2/2010 | von der Bank | |
| 7,779,636 B2 | 8/2010 | Buelow et al. | |
| 7,788,927 B2 | 9/2010 | McMasters et al. | |
| 8,127,553 B2 | 3/2012 | Ekkad et al. | |
| 8,166,763 B2 | 5/2012 | Piper et al. | |
| 8,220,270 B2 | 7/2012 | Bathina et al. | |
| 8,555,645 B2 * | 10/2013 | Duncan | F23R 3/14 60/737 |
| 8,555,646 B2 | 10/2013 | Stevenson et al. | |
| 8,616,471 B2 | 12/2013 | Short | |
| 2004/0250547 A1 * | 12/2004 | Mancini | F23D 11/107 60/740 |
| 2007/0028595 A1 * | 2/2007 | Mongia | F02K 3/04 60/226.1 |
| 2007/0028618 A1 | 2/2007 | Hsiao et al. | |
| 2009/0255256 A1 * | 10/2009 | McMasters | B22F 3/1055 60/734 |
| 2009/0255262 A1 * | 10/2009 | McMasters | F23R 3/14 60/742 |
| 2010/0251719 A1 * | 10/2010 | Mancini | F23R 3/14 60/737 |
| 2010/0269506 A1 * | 10/2010 | Nonaka | F23D 11/386 60/742 |
| 2012/0060465 A1 | 3/2012 | Etcheparre | |
| 2013/0145765 A1 * | 6/2013 | Patel | F23R 3/286 60/737 |

FOREIGN PATENT DOCUMENTS

| | | |
|---|---|---|
| WO | 2014078694 A1 | 5/2014 |
| WO | 2015199376 A1 | 4/2016 |

OTHER PUBLICATIONS

U.S. Appl. No. 61/787,961, filed Mar. 15, 2013 and is General Electric Company.

* cited by examiner

FUEL NOZZLE STRUCTURE

BACKGROUND OF THE INVENTION

The present invention relates to gas turbine engine fuel nozzles and, more particularly, to main injection structures for gas turbine engine fuel nozzles.

Aircraft gas turbine engines include a combustor in which fuel is burned to input heat to the engine cycle. Typical combustors incorporate one or more fuel injectors whose function is to introduce liquid fuel into an air flow stream so that it can atomize and burn.

Staged combustors have been developed to operate with low pollution, high efficiency, low cost, high engine output, and good engine operability. In a staged combustor, the nozzles of the combustor are operable to selectively inject fuel through two or more discrete stages, each stage being defined by individual fuel flowpaths within the fuel nozzle. For example, the fuel nozzle may include a pilot stage that operates continuously, and a main stage that only operates at higher engine power levels. The fuel flowrate may also be variable within each of the stages.

The main stage includes an annular main injection ring having a plurality of fuel injection ports which discharge fuel through a surrounding centerbody into a swirling mixer airstream. A need with this type of fuel nozzle is to make sure that fuel is not ingested into voids within the fuel nozzle where it could ignite causing internal damage and possibly erratic operation. It is also desirable to have good fuel jet penetration into the mixer airstream.

BRIEF DESCRIPTION OF THE INVENTION

This need is addressed by the present invention, which provides a fuel nozzle incorporating an injection structure configured to generate an airflow that purges and assists penetration of a fuel stream into a high velocity airstream.

According to one aspect of the invention, A fuel nozzle apparatus for a gas turbine engine includes: an annular outer body, the outer body extending parallel to a centerline axis, the outer body having a generally cylindrical exterior surface extending between forward and aft ends, and having a plurality of openings passing through the exterior surface; an annular main injection ring disposed inside the outer body, the main injection ring including an annular array of fuel posts extending radially outward therefrom; a main fuel gallery extending within the main injection ring in a circumferential direction; a plurality of main fuel orifices, each main fuel orifice communicating with the main fuel gallery and extending through one of the fuel posts; and a suspension structure connecting the main injection ring to the outer body, the suspension structure configured to substantially rigidly locate the position of the main ring in axial and lateral directions while permitting controlled deflection in a radial direction.

According to another aspect of the invention, the suspension structure includes: an annular flange extending radially inward from the outer body aft of the openings; an annular inner arm extending forward from the flange in a generally axial direction, and passing radially inboard of the main injection ring; an annular outer arm extending axially forward from the main injection ring; and a U-bend interconnecting the inner and outer arms at a location axially forward of the main injection ring.

According to another aspect of the invention, a baffle extends forward from the flange in a generally axial direction and passes radially outboard of the main injection ring; and the baffle includes an opening through which the fuel post passes.

According to another aspect of the invention, a forward end of the baffle is connected to the outer body forward of the openings.

According to another aspect of the invention, each fuel post includes a perimeter wall defining a cylindrical lateral surface and a radially-outward-facing floor recessed radially inward from a distal end surface of the perimeter wall to define a spray well; and each fuel post is aligned with one of the openings in the outer body and separated from the opening by a perimeter gap which is defined between the opening and the lateral surface.

According to another aspect of the invention, the fuel post extends radially outward beyond an outer surface of the outer body.

According to another aspect of the invention, each fuel post is elongated in plan view and includes a perimeter wall defining a lateral surface and a radially-outward-facing floor recessed radially inward from a distal end surface of the perimeter wall to define a spray well; and each fuel post is aligned with one of the openings in the outer body and separated from the opening by a perimeter gap which is defined between the opening and the lateral surface.

According to another aspect of the invention, at least one air assist port is formed in the perimeter wall near an intersection of the perimeter wall with the floor.

According to another aspect of the invention, at least one of the fuel posts incorporates a ramp-shaped scarf extending along a line parallel to the distal end surface, the scarf having a maximum radial depth at the spray well and tapering outward in radial height, joining the distal end surface at a distance away from the spray well.

According to another aspect of the invention, the perimeter wall of each fuel post is teardrop-shaped in plan view.

According to another aspect of the invention, a radial gap is present between the fuel posts and the outer body; each fuel post includes a perimeter wall defining a cylindrical lateral surface and a bore defining a radially-outward-facing floor recessed radially inward from a distal end surface of the perimeter wall; and a generally tubular slip seal is received in the bore of each fuel post and spans the radial gap.

According to another aspect of the invention, each slip seal is fixed in one of the openings of the outer body and is received in the corresponding bore of a fuel post with a slip fit.

According to another aspect of the invention, the apparatus further includes: an annular venturi including a throat of minimum diameter disposed inside the main injection ring; an annular splitter disposed inside the venturi; an array of outer swirl vanes extending between the venturi and the splitter; a pilot fuel injector disposed within the splitter; and an array of inner swirl vanes extending between the splitter and the pilot fuel injector.

According to another aspect of the invention, the apparatus further includes: a fuel system operable to supply a flow of liquid fuel at varying flowrates; a pilot fuel conduit coupled between the fuel system and the pilot fuel injector; and a main fuel conduit coupled between the fuel system and the main injection ring.

BRIEF DESCRIPTION OF THE DRAWINGS

The invention may be best understood by reference to the following description, taken in conjunction with the accompanying drawing figures in which.

DETAILED DESCRIPTION OF THE INVENTION

Generally, the present invention provides a fuel nozzle with an injection ring. The main injection ring incorporates an injection structure configured to generate an airflow through a controlled gap surrounding a fuel orifice that flows fuel from the main injection ring, and assists penetration of a fuel stream from the fuel orifice into a high velocity airstream. The main injection ring is supported by a structure that provides substantially one degree of freedom of movement.

Figure 1:
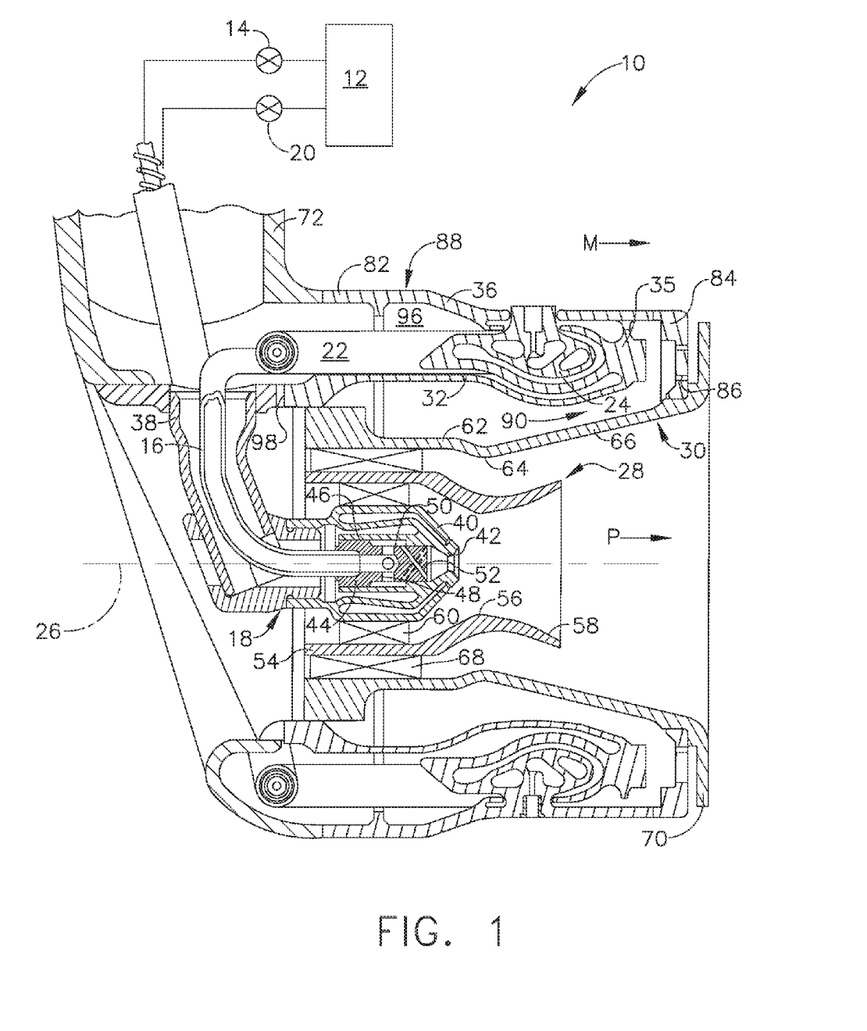
FIG. 1 is a schematic cross-sectional view of a gas turbine engine fuel nozzle constructed according to an aspect of the present invention.

Now, referring to the drawings wherein identical reference numerals denote the same elements throughout the various views, FIG. 1 depicts an exemplary of a fuel nozzle 10 of a type configured to inject liquid hydrocarbon fuel into an airflow stream of a gas turbine engine combustor (not shown). The fuel nozzle 10 is of a "staged" type meaning it is operable to selectively inject fuel through two or more discrete stages, each stage being defined by individual fuel flowpaths within the fuel nozzle 10. The fuel flowrate may also be variable within each of the stages.

The fuel nozzle 10 is connected to a fuel system 12 of a known type, operable to supply a flow of liquid fuel at varying flowrates according to operational need. The fuel system supplies fuel to a pilot control valve 14 which is coupled to a pilot fuel conduit 16, which in turn supplies fuel to a pilot 18 of the fuel nozzle 10. The fuel system 12 also supplies fuel to a main valve 20 which is coupled to a main fuel conduit 22, which in turn supplies a main injection ring 24 of the fuel nozzle 10.

For purposes of description, reference will be made to a centerline axis 26 of the fuel nozzle 10 which is generally parallel to a centerline axis of the engine (not shown) in which the fuel nozzle 10 would be used. Starting from the centerline axis 26 and proceeding radially outward, the major components of the illustrated fuel nozzle 10 are: the pilot 18, a splitter 28, a venturi 30, an inner body 32, the main injection ring 24, and an outer body 36. Each of these structures will be described in detail.

The pilot 18 is disposed at an upstream end of the fuel nozzle 10, aligned with the centerline axis 26 and surrounded by a fairing 38.

The illustrated pilot 18 includes a generally cylindrical, axially-elongated, pilot centerbody 40. An upstream end of the pilot centerbody 40 is connected to the fairing 38. The downstream end of the pilot centerbody 40 includes a converging-diverging discharge orifice 42 with a conical exit.

A metering plug 44 is disposed within a central bore 46 of the pilot centerbody 40. The metering plug 44 communicates with the pilot fuel conduit. The metering plug 44 includes transfer holes 48 that flow fuel to a feed annulus 50 defined between the metering plug 44 and the central bore 46, and also includes an array of angled spray holes 52 arranged to receive fuel from the feed annulus 50 and flow it towards the discharge orifice 42 in a swirling pattern, with a tangential velocity component.

The annular splitter 28 surrounds the pilot injector 18. It includes, in axial sequence: a generally cylindrical upstream section 54, a throat 56 of minimum diameter, and a downstream diverging section 58.

An inner air swirler comprises a radial array of inner swirl vanes 60 which extend between the pilot centerbody 40 and the upstream section 54 of the splitter 28. The inner swirl vanes 60 are shaped and oriented to induce a swirl into air flow passing through the inner air swirler.

The annular venturi 30 surrounds the splitter 28. It includes, in axial sequence: a generally cylindrical upstream section 62, a throat 64 of minimum diameter, and a downstream diverging section 66. A radial array of outer swirl vanes 68 defining an outer air swirler extends between the splitter 28 and the venturi 30. The outer swirl vanes 68, splitter 28, and inner swirl vanes 60 physically support the pilot 18. The outer swirl vanes 68 are shaped and oriented to induce a swirl into air flow passing through the outer air swirler. The bore of the venturi 30 defines a flowpath for a pilot air flow, generally designated "P", through the fuel nozzle 10. A heat shield 70 in the form of an annular, radially-extending plate may be disposed at an aft end of the diverging section 66. A thermal barrier coating (TBC) (not shown) of a known type may be applied on the surface of the heat shield 70 and/or the diverging section 66.

The inner body 32 may be connected to the fairing 38 and serves as part of a mechanical connection between the main injection ring 24 and stationary mounting structure such as a fuel nozzle stem, a portion of which is shown as item 72.

The main injection ring 24 which is annular in form surrounds the inner body 32. It is connected to the inner body 32 and to the outer body 36 by a suspension structure which is described in more detail below.

The main injection ring 24 includes a main fuel gallery 76 (see FIG. 2) which is coupled to and supplied with fuel by the main fuel conduit 22. A radial array of main fuel orifices 78 formed in the main injection ring 24 communicate with the main fuel gallery 76. During engine operation, fuel is discharged through the main fuel orifices 78. Running through the main injection ring 24 closely adjacent to the main fuel gallery 76 are one or more pilot fuel galleries 80. During engine operation, fuel constantly circulates through the pilot fuel galleries 80 to cool the main injection ring 24 and prevent coking of the main fuel gallery 76 and the main fuel orifices 78.

The annular outer body 36 surrounds the main injection ring 24, venturi 30, and pilot 18, and defines the outer extent of the fuel nozzle 10. In the illustrated example, an aft end of the inner body 32 is connected to the outer body 36 by a radially-extending flange 35. A forward end 82 of the outer body 36 is joined to the stem 72 when assembled (see FIG. 1). An aft end of the outer body 36 may include an annular, radially-extending baffle 84 incorporating cooling holes 86 directed at the heat shield 70. Extending between the forward and aft ends is a generally cylindrical exterior surface 88 which in operation is exposed to a mixer airflow, generally designated "M." The outer body 36 defines a secondary flowpath 90, in cooperation with the venturi 30 and the inner body 32. Air passing through this secondary flowpath 90 is discharged through the cooling holes 86.

The outer body 36 includes an annular array of openings 94. Each of the main fuel orifices 78 is aligned with one of the openings 94.

The outer body 36 and the inner body 32 cooperate to define an annular tertiary space or void 96 protected from the surrounding, external air flow. The main injection ring 24 is contained in this void. Within the fuel nozzle 10, a flowpath is provided for the tip air stream to communicate with and supply the void 96 a minimal flow needed to maintain a small pressure margin above the external pressure at locations near the openings 94. In the illustrated example, this flow is provided by small supply slots 98.

The fuel nozzle 10 and its constituent components may be constructed from one or more metallic alloys. Nonlimiting examples of suitable alloys include nickel and cobalt-based alloys.

All or part of the fuel nozzle 10 or portions thereof may be part of a single unitary, one-piece, or monolithic component, and may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being term herein to refer generally to such processes. Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

Figure 2:
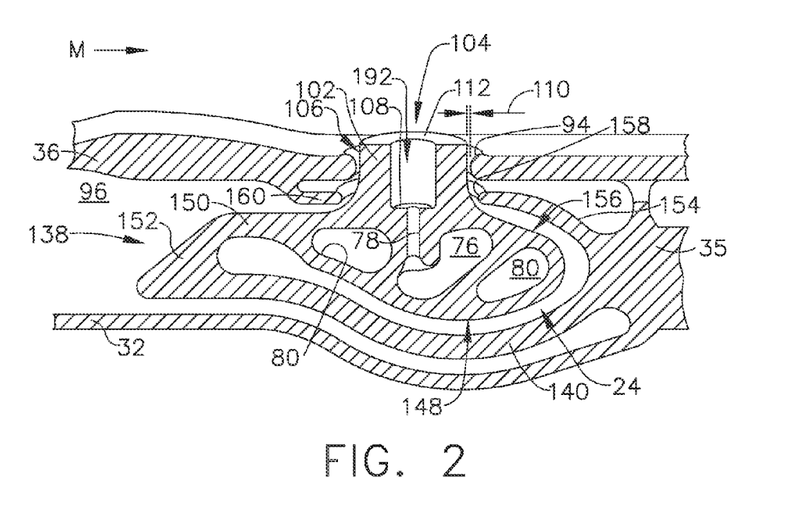
FIG. 2 is an enlarged view of a portion of the fuel nozzle of FIG. 1, showing a main fuel injection structure thereof.
Figure 3:
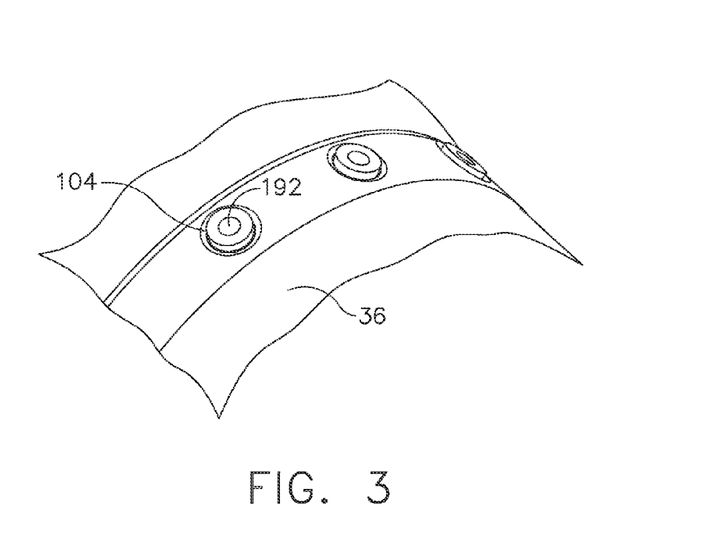
FIG. 3 is a partial perspective view of the fuel injection structure shown in FIG. 2.

The main injection ring 24, main fuel orifices 78, and openings 94 may be configured to provide a controlled secondary purge air path and an air assist at the main fuel orifices 78. Referring to FIGS. 2 and 3, the openings 94 are generally cylindrical and oriented in a radial direction.

The main injection ring 24 includes a plurality of raised fuel posts 104 extending radially outward therefrom. The fuel posts 104 include a perimeter wall 102 defining a cylindrical lateral surface 106. A radially-facing floor 108 is recessed from a distal end surface 112 of the perimeter wall 102, and in combination with the perimeter wall 102, defines a spray well 192. Each of the main fuel orifices 78 communicates with the main fuel gallery 76 and passes through one of the fuel posts 104, exiting through the floor 108 of the fuel post 104. Each fuel post 104 is aligned with one of the openings 94 and is positioned to define a perimeter gap 110 in cooperation with the associated opening 94. These small controlled gaps 110 around the fuel posts 104 permit minimal purge air to flow through to protect internal tip space or void 96 from fuel ingress.

The main injection ring 24 is attached to the inner body 32 and to the outer body 36 by a suspension structure 138. The suspension structure 138 includes an annular inner arm 140 extending forward from the flange 35 in a generally axial direction. The inner arm 140 passes radially inboard of the main injection ring 24. In section view the inner arm 140 is curved convex-inward, and is spaced-away from and generally parallels the convex curvature of an inner surface 148 of the main injection ring 24. An annular outer arm 150 extends axially forward from the main injection ring 24. A U-bend 152 interconnects the inner and outer arms 140 and 150 at a location axially forward of the main injection ring 24. A baffle 154 extends forward from the flange 35 in a generally axial direction. The baffle 154 passes radially outboard of the main injection ring 24, between the main injection ring 24 and the outer body 36. In section view the baffle 154 is curved convex-outward, and is spaced-away from and generally parallels the convex curvature of an outer surface 156 of the main injection ring 24. The baffle 154 includes an opening 158 through which the fuel post 104 passes, and a forward end 160 of the baffle is connected to the outer body 36 forward of the opening 94.

The suspension structure 138 is effective to substantially rigidly locate the position of the main injection ring 24 in axial and tangential (or lateral) directions while permitting controlled deflection in a radial direction. This is accomplished by the size, shape, and orientation of the elements of the suspension structure. In particular, the inner and outer arms 140, 150 and the U-bend 152 are configured to act as a spring element in the radial direction. In effect, the main injection ring 24 substantially has one degree of freedom of movement ("1-DOF").

During engine operation, the outer body 36 is exposed to a flow of high-temperature air and therefore experiences significant thermal expansion and contraction, while the main injection ring 24 is constantly cooled by a flow of liquid fuel and remains relative stable. The effect of the suspension structure 138 is to permit thermal growth of the outer body 36 relative to the main injection ring 24 while maintaining the size of the perimeter gaps 110 described above, thereby maintaining the effectiveness of the purge flow.

Figure 4:
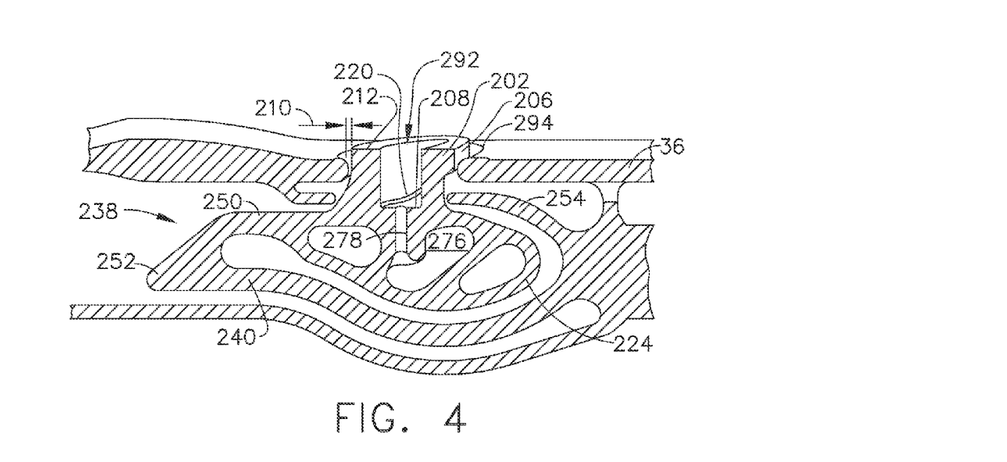
FIG. 4 is a sectional view of a portion of a fuel nozzle, showing an alternative main fuel injection structure.
Figure 5:
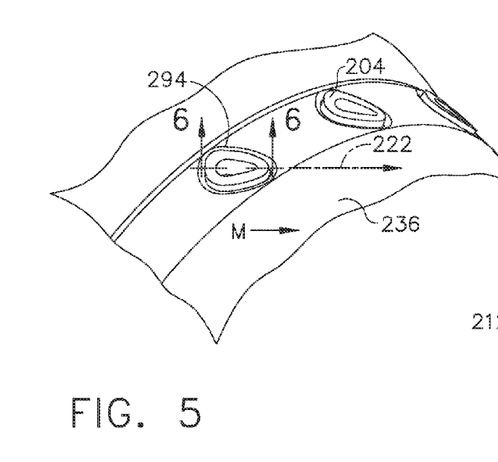
FIG. 5 is a partial perspective view of the fuel injection structure shown in FIG. 4.
Figure 6:
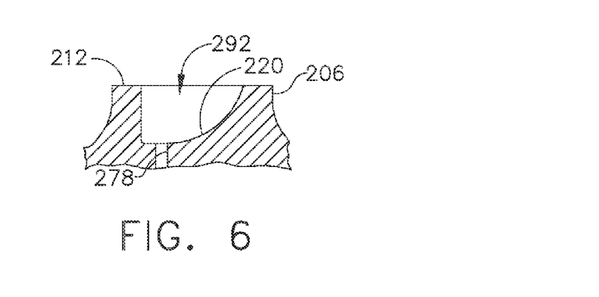
FIG. 6 is a view taken along lines 6-6 of FIG. 5.

FIGS. 4-6 illustrate an alternative configuration for providing controlled purge air exit and injection air assist. Specifically, these figures illustrate a portion of a main injection ring 224 and an outer body 236 which may be substituted for the main injection ring 24 and outer body 36 described above. Any structures or features of the main injection ring 224 and the outer body 236 that are not specifically described herein may be assumed to be identical to the main injection ring 24 and outer body 36 described above. The outer body 236 includes an annular array of openings 294 which are generally elongated in plan view. They may be oval, elliptical, or another elongated shape. In the specific example illustrated they are "teardrop-shaped," having two convex-curved ends, with end having a greater width than the other end.

A radial array of main fuel orifices 278 formed in the main injection ring 224 communicate with a main fuel gallery 276. The main injection ring 224 includes a plurality of raised fuel posts 204 extending radially outward therefrom. The fuel posts 204 include a perimeter wall 202 defining a lateral surface 206. In plan view the fuel posts 204 are elongated and may be, for example, oval, elliptical, or teardrop-shaped as illustrated. A circular bore is formed in the fuel post 204, defining a floor 208 recessed from a distal end face 212 of the perimeter wall 202, and in combination with the perimeter wall 202, defines a spray well 292. Each of the main fuel orifices 278 communicates with a main fuel gallery 276 and passes through one of the fuel posts 204, exiting through the floor 208 of the fuel post 204. Each fuel post 204 is aligned with one of the openings 294 and is positioned to define a perimeter gap 210 in cooperation with the associated opening 294. These small controlled gaps 210 around the fuel posts 204 permit minimal purge air to flow through to protect internal tip space from fuel ingress.

The main injection ring 224 is attached to the main ring support 224 and to the outer body 236 by a suspension structure 238 substantially identical to the suspension structure 138 described above, which includes an inner arm 240, an outer arm 250, a U-bend 252, and a baffle 254.

The elongated shape of the fuel posts 204 provides surface area so that the distal end 212 of one or more of the fuel posts 204 can be configured to incorporate a ramp-shaped "scarf." The scarfs can be arranged to generate local static pressure differences between adjacent main fuel orifices 278. These local static pressure differences between adjacent main fuel orifices 278 may be used to purge stagnant main fuel from the main injection ring 224 during periods of pilot-only operation as to avoid main circuit coking.

When viewed in cross-section as seen in FIG. 4, the scarf 220 has its greatest radial depth (measured relative to the distal end 212) at its interface with the associated spray well 292 and ramps or tapers outward in radial height, joining the distal end face 212 at some distance away from the spray well 292. In plan view, as seen in FIG. 5, the scarf 220 extends away from the main fuel port 278 along a line 222 and tapers in lateral width to a minimum width at its distal end. The direction that the line 222 extends defines the orientation of the scarf 220. The scarf 220 shown in FIG. 5 is referred to as a "downstream" scarf, as it is parallel to a streamline of the rotating or swirling mixer airflow M and has its distal end located downstream from the associated main fuel orifice 278 relative to the mixer airflow M.

The presence or absence of the scarf 220 and orientation of the scarf 220 determines the static air pressure present at the associated main fuel orifice 278 during engine operation. The mixer airflow M exhibits "swirl," that is, its velocity has both axial and tangential components relative to the centerline axis 26. To achieve the purge function mentioned above, the spray wells 292 may be arranged such that different ones of the main fuel orifices 278 are exposed to different static pressures during engine operation. For example, each of the main fuel orifices 278 not associated with a scarf 220 would be exposed to the generally prevailing static pressure in the mixer airflow M. For purposes of description these are referred to herein as "neutral pressure ports." Each of the main fuel orifices 278 associated with a "downstream" scarf 220 as seen in FIG. 5 would be exposed to reduced static pressure relative to the prevailing static pressure in the mixer airflow M. For purposes of description these are referred to herein as "low pressure ports." While not shown, it is also possible that one or more scarfs 220 could be oriented opposite to the orientation of the downstream scarfs 220. These would be "upstream scarfs" and the associated main fuel orifices 278 would be exposed to increased static pressure relative to the prevailing static pressure in the mixer airflow M. For purposes of description these are referred to herein as "high pressure ports."

The main fuel orifices 278 and scarfs 220 may be arranged in any configuration that will generate a pressure differential effective to drive a purging function which may be used to purge residual fuel from the main fuel gallery 276 when the main injection ring 224 is not in active use. For example, positive pressure ports could alternate with neutral pressure ports, or positive pressure ports could alternate with negative pressure ports.

Figure 7:
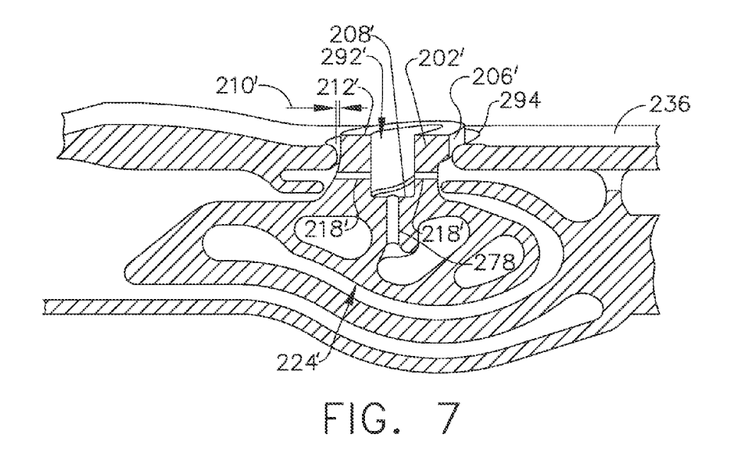
FIG. 7 is a sectional view of a portion of a fuel nozzle, showing an alternative main fuel injection structure.
Figures 8, 9:
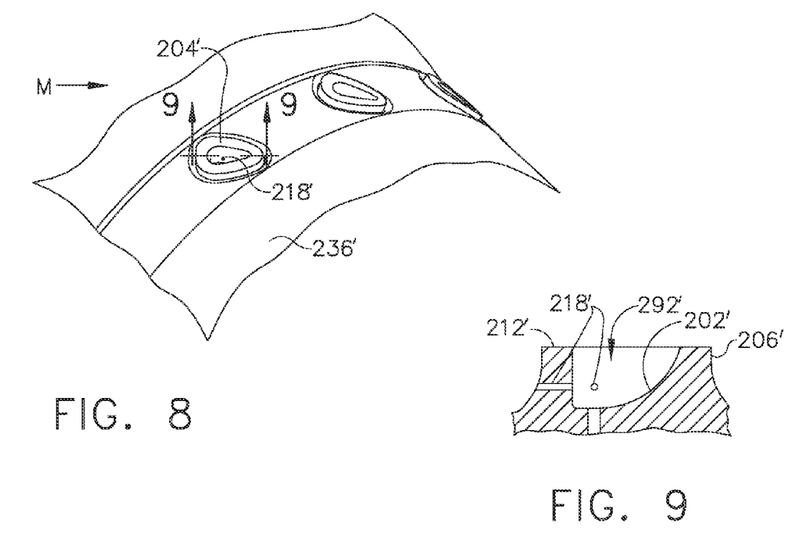
FIG. 8 is a partial perspective view of the fuel injection structure shown in FIG. 7.
FIG. 9 is a view taken along lines 9-9 of FIG. 7.

FIGS. 7-9 illustrate a variation of the main injection ring 224 shown in FIGS. 4 and 5, noted at 224'. The main injection ring 224' and surrounding structures may be identical to the main injection ring 224 except for the configuration of the fuel posts 204'. In this variation, the fuel posts 204' include a perimeter wall 202' defining a lateral surface 206', and incorporate a circular bore defining a floor 208' recessed from a distal end face 212' of the perimeter wall 202'. In combination with the perimeter wall 202', the floor 208' defines a spray well 292', communicating with the main fuel orifice 278. The spray well 292' may include a scarf 220' as described above. Each fuel post 204' is aligned with one of the openings 294 and is positioned to define a perimeter gap 210' in cooperation with the associated opening 294.

One or more small-diameter assist ports 218' may be formed through the perimeter wall 202' of each fuel post 204' near its intersection with the floor 208' of the fuel post 204'. Air flow passing through the assist ports 218' provides an air-assist to facilitate penetration of fuel flowing from the main fuel orifices 278 through the spray wells 292' and into the local, high velocity mixer airstream M.

Figure 10:
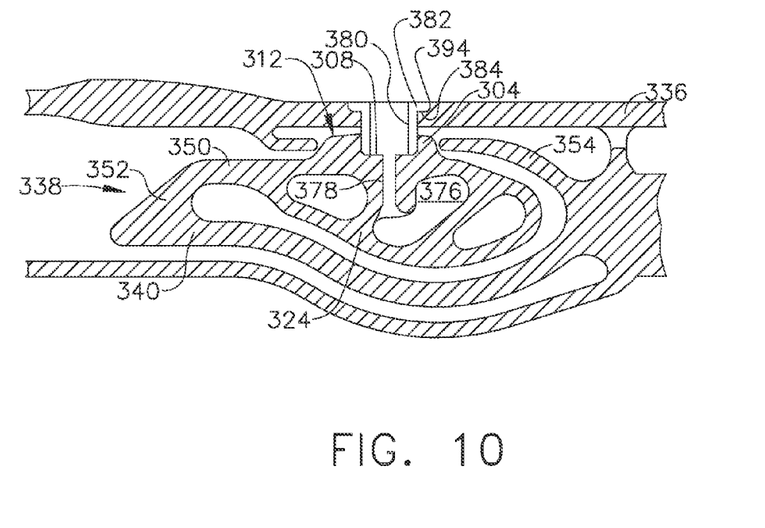
FIG. 10 is a sectional view of a portion of a fuel nozzle, showing an alternative main fuel injection structure.
Figure 11:
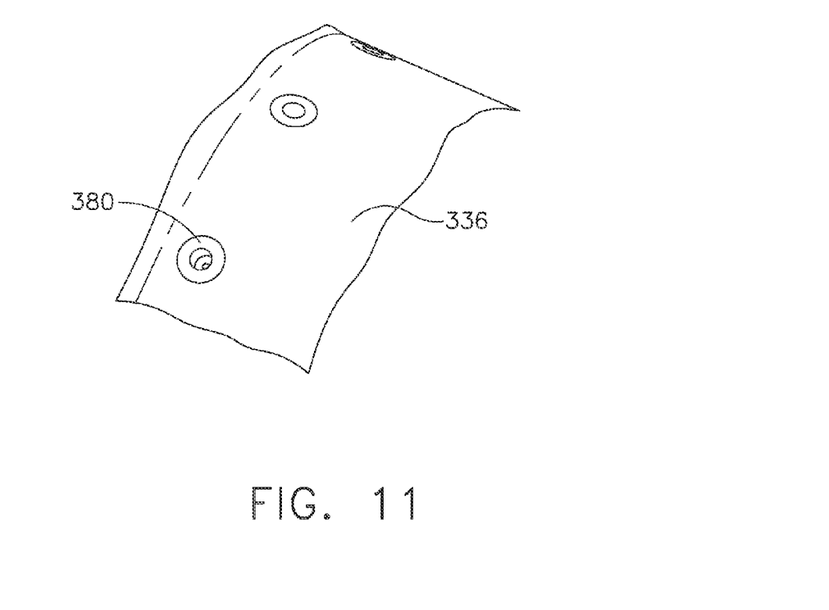
FIG. 11 is a partial perspective view of the fuel injection structure shown in FIG. 6.

FIGS. 10 and 11 illustrate another alternative configuration for providing controlled purge air exit and injection air assist. Specifically, these figures illustrate a portion of a main injection ring 324 and an outer body 336 which may be substituted for the main injection ring 24 and outer body 36 described above. Any structures or features of the main injection ring 324 and the outer body 336 that are not specifically described herein may be assumed to be identical to the main injection ring 24 and outer body 36 described above. The outer body 336 includes an annular array of openings 394 which are generally elongated in plan view. They may be oval, elliptical, or another elongated shape. In the specific example illustrated they are generally cylindrical and oriented in a radial direction.

The main injection ring 324 includes a plurality of raised fuel posts 304 extending radially outward therefrom. The fuel posts 304 include circular bore is formed in the fuel post 304, defining a floor 308 recessed from a distal end face 312, which is radially spaced-away from the outer body 336 by a small radial gap. A radial array of main fuel orifices 378 are formed in the main injection ring 324. Each of the main fuel orifices 378 communicates with a main fuel gallery 376 and passes through one of the fuel posts 304, exiting through the floor 308 of the fuel post 304.

The main injection ring 324 is attached to the outer body 36 by a suspension structure 338 substantially identical to the suspension structure 138 described above, which includes an inner arm 340, an outer arm 350, a U-bend 352, and a baffle 354.

A slip seal 380 spans the gap between the fuel post 304 and the outer body 336. In the illustrated example the slip seal 380 is a small cylindrical tube with a radially-extending flange 382. The flange 382 is received in an annular rabbet 384 in the opening 394. The slip seal 380 is fixed relative to the outer body 336. This may be accomplished, for example, by a bonding method such as welding or brazing.

The slip seal 380 is received in the bore with a sliding fit, i.e. with a small diametrical clearance. In operation, the main injection ring 324 can move relative to the outer body 336 solely in a radial direction, and remains engaged with the slip seal 380 at all times.

The invention described above has several benefits. It provides a means to prevent voids within a fuel nozzle from ingesting fuel and to assist fuel penetration into an airstream. It also provides consistent purge gap size despite any relative thermal movement of the fuel ring and the adjacent outer body.

The foregoing has described a main injection structure for a gas turbine engine fuel nozzle. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A fuel nozzle apparatus for a gas turbine engine, comprising:
   an annular outer body, the outer body extending parallel to a centerline axis, the outer body having a generally cylindrical exterior surface extending between forward and aft ends, and having a plurality of openings passing through the exterior surface;
   an annular main injection ring disposed inside the outer body, the main injection ring including an annular array of fuel posts extending radially outward therefrom;
   a main fuel gallery extending within the main injection ring in a circumferential direction;
   a plurality of main fuel orifices, each main fuel orifice communicating with the main fuel gallery and extending through one of the fuel posts; and
   a suspension structure connecting the main injection ring to the outer body, the suspension structure configured to permit deflection of the main injection ring in a radial direction, wherein the suspension structure includes:
   an annular flange extending radially inward from the outer body aft of the openings;
   an annular inner arm extending forward from the flange in a generally axial direction, and passing radially inboard of the main injection ring;
   an annular outer arm extending axially forward from the main injection ring; and a U-bend interconnecting the inner and outer arms at a location axially forward of the main injection ring.

2. The apparatus of claim 1 wherein: a baffle extends forward from the flange in a generally axial direction and passes radially outboard of the main injection ring; and the baffle includes an opening through which one of the fuel posts passes.

3. The apparatus of claim 2 wherein a forward end of the baffle is connected to the outer body forward of the openings.

4. The apparatus of claim 1 wherein:
   each fuel post includes a perimeter wall defining a cylindrical lateral surface and a radially-outward-facing floor recessed radially inward from a distal end surface of the perimeter wall to define a spray well; and
   each fuel post is aligned with one of the openings in the outer body and separated from the one of the openings by a perimeter gap which is defined between the one of the openings and the lateral surface.

5. The apparatus of claim 4 wherein each fuel post extends radially outward beyond the exterior surface of the outer body.

6. The apparatus of claim 1 wherein:
   each fuel post is elongated in plan view and includes a perimeter wall defining a lateral surface and a radially-outward-facing floor recessed radially inward from a distal end surface of the perimeter wall to define a spray well; and
   each fuel post is aligned with one of the openings in the outer body and separated from the one of the openings by a perimeter gap which is defined between the one of the openings and the lateral surface.

7. The apparatus of claim 6 wherein at least one air assist port is formed in the perimeter wall near an intersection of the perimeter wall with the floor.

8. The apparatus of claim 6 wherein at least one of the fuel posts incorporates a ramp-shaped scarf extending along a line parallel to the distal end surface, the scarf having a maximum radial depth at the spray well and tapering outward in radial height, joining the distal end surface at a distance away from the spray well.

9. The apparatus of claim 6 wherein the perimeter wall of each fuel post is teardrop-shaped in plan view.

10. The apparatus of claim 1 wherein:
    a radial gap is present between the fuel posts and the outer body;
    each fuel post includes a perimeter wall defining a cylindrical lateral surface and a bore defining a radially-outward-facing floor recessed radially inward from a distal end surface of the perimeter wall; and
    a generally tubular slip seal is received in the bore of each fuel post and spans the radial gap.

11. The apparatus of claim 10 wherein each slip seal is fixed in one of the openings of the outer body and is received in the corresponding bore of one of the fuel posts with a slip fit.

12. The apparatus of claim 1 further including:
    an annular venturi including a throat of minimum diameter disposed inside the main injection ring;
    an annular splitter disposed inside the venturi;
    an array of outer swirl vanes extending between the venturi and the splitter;
    a pilot fuel injector disposed within the splitter; and
    an array of inner swirl vanes extending between the splitter and the pilot fuel injector.

13. The apparatus of claim 1 further including:
    a fuel system operable to supply a flow of liquid fuel at varying flowrates;
    a pilot fuel conduit coupled between the fuel system and a pilot fuel injector; and
    a main fuel conduit coupled between the fuel system and the main injection ring.

* * * * *

UNITED STATES PATENT AND TRADEMARK OFFICE
CERTIFICATE OF CORRECTION

| | | |
|---|---|---|
| PATENT NO. | : 9,453,461 B2 | Page 1 of 1 |
| APPLICATION NO. | : 14/580301 | |
| DATED | : September 27, 2016 | |
| INVENTOR(S) | : Patel et al. | |

It is certified that error appears in the above-identified patent and that said Letters Patent is hereby corrected as shown below:

In the Specification

In Column 5, Line 36, delete "Sterolithography" and insert -- Stereolithography --, therefor.

In Column 7, Lines 1-2, delete "The main injection ring 224 is attached to the main ring support 224 and to the outer body 236" and insert -- The main injection ring 224 is attached to the outer body 236 --, therefor.

In Column 7, Line 22, delete "port 278" and insert -- orifice 278 --, therefor.

Signed and Sealed this
Twenty-eighth Day of February, 2017

Michelle K. Lee
*Director of the United States Patent and Trademark Office*